(12) United States Patent
Ye et al.

(10) Patent No.: US 6,923,540 B2
(45) Date of Patent: Aug. 2, 2005

(54) TORIC MULTIFOCAL CONTACT LENSES

(75) Inventors: Ming Ye, Fort Worth, TX (US); Joseph Michael Lindacher, Lawrenceville, GA (US)

(73) Assignee: Novartis AG, Basel (CH)

( * ) Notice: Subject to any disclaimer, the term of this patent is extended or adjusted under 35 U.S.C. 154(b) by 25 days.

(21) Appl. No.: 10/616,376

(22) Filed: Jul. 9, 2003

(65) Prior Publication Data

US 2004/0021824 A1 Feb. 5, 2004

Related U.S. Application Data

(60) Provisional application No. 60/400,254, filed on Jul. 31, 2002.

(51) Int. Cl.$^7$ .................................................. G02C 7/04
(52) U.S. Cl. ........................................ 351/161; 351/177
(58) Field of Search ................................. 351/161, 177

(56) References Cited

U.S. PATENT DOCUMENTS

| | | | |
|---|---|---|---|
| 4,095,878 A | 6/1978 | Fanti | 351/161 |
| 4,580,882 A | 4/1986 | Nuchman et al. | 351/161 |
| 4,636,049 A | 1/1987 | Blaker | 351/161 |
| 4,752,123 A | 6/1988 | Blaker | 351/161 |
| 4,869,587 A | 9/1989 | Breger | 351/161 |
| 4,890,913 A | 1/1990 | De Carle | 351/161 |
| 4,936,672 A | 6/1990 | Capez | 351/161 |
| 4,971,432 A | 11/1990 | Koeniger | 351/161 |
| 4,976,534 A | 12/1990 | Miege et al. | 351/161 |
| 5,125,729 A | 6/1992 | Mercure | 351/161 |
| 5,141,301 A | 8/1992 | Morstad | 351/161 |
| 5,172,143 A | 12/1992 | Baude et al. | 351/177 |
| 5,214,453 A | 5/1993 | Giovanzana | 351/161 |
| 5,406,341 A | 4/1995 | Blum et al. | 351/160 |
| 5,422,687 A | 6/1995 | Tanaka et al. | 351/161 |
| 5,517,259 A | 5/1996 | Blum et al. | 351/160 |
| 5,528,321 A | 6/1996 | Blum et al. | 351/160 |

(Continued)

FOREIGN PATENT DOCUMENTS

| | | |
|---|---|---|
| EP | 0 980 015 | 2/2000 |
| EP | 0 996 024 | 4/2000 |
| JP | 08220487 A | 8/1996 |
| WO | WO 01/25290 | 4/2001 |
| WO | WO 01/51978 | 7/2001 |

OTHER PUBLICATIONS

International Search Report

*Primary Examiner*—Scott J. Sugarman
(74) *Attorney, Agent, or Firm*—Jian Zhou; Robert J. Gorman

(57) ABSTRACT

The present invention provides a toric multifocal contact lens having a cylindrical optical power to correct astigmatism vision errors and a multifocal power to compensate for presbyopia. A toric multifocal contact lens of the invention has a central axis, an anterior surface having a first central optical zone, and an opposite posterior surface having a second central optical zone. The first central optical zone and the second central optical zone combine to provide a cylindrical optical power to correct astigmatism vision errors and a multifocal power to compensate for presbyopia.

50 Claims, 2 Drawing Sheets

U.S. PATENT DOCUMENTS

| | | | | |
|---|---|---|---|---|
| 5,532,768 | A | 7/1996 | Onogi et al. | 351/160 |
| 5,598,234 | A | 1/1997 | Blum et al. | 351/160 |
| 5,608,471 | A | 3/1997 | Miller | 351/161 |
| 5,611,970 | A | 3/1997 | Apollonio et al. | 264/2.5 |
| 5,650,837 | A | 7/1997 | Roffman et al. | 351/161 |
| 5,652,638 | A | 7/1997 | Roffman et al. | 351/161 |
| 5,691,797 | A | 11/1997 | Seidner et al. | 351/161 |
| 5,715,031 | A | 2/1998 | Roffman et al. | 351/161 |
| 5,754,270 | A | 5/1998 | Rehse et al. | 351/161 |
| 5,793,465 | A | 8/1998 | Gupta et al. | 351/161 |
| 5,796,462 | A | 8/1998 | Roffman et al. | 351/161 |
| 5,805,260 | A | 9/1998 | Roffman et al. | 351/161 |
| 5,805,266 | A | 9/1998 | Gupta et al. | 351/177 |
| 5,847,802 | A | 12/1998 | Menezes et al. | 351/161 |
| 5,864,379 | A | 1/1999 | Dunn | 351/161 |
| 5,872,613 | A | 2/1999 | Blum et al. | 351/177 |
| 5,965,330 | A | 10/1999 | Legerton et al. | 351/160 |
| 6,106,118 | A | 8/2000 | Menezes et al. | 351/169 |
| 6,113,236 | A | 9/2000 | Chapman et al. | 351/160 |
| 6,123,422 | A | 9/2000 | Menezes et al. | 351/177 |
| 6,139,148 | A | 10/2000 | Menezes | 351/169 |
| 6,142,625 | A | 11/2000 | Sawano et al. | 351/161 |
| 6,149,271 | A | 11/2000 | Menezes et al. | 351/169 |
| 6,176,578 | B1 | 1/2001 | Clutterbuck et al. | 351/160 |
| 6,176,579 | B1 | 1/2001 | Mandell | 351/161 |
| 6,199,982 | B1 | 3/2001 | Oyanna et al. | 351/161 |
| 6,210,005 | B1 | 4/2001 | Portney | 351/161 |
| 6,244,709 | B1 | 6/2001 | Vayntraub et al. | 351/161 |
| 6,260,966 | B1 | 7/2001 | Sawano et al. | 351/161 |
| 6,390,622 | B1 | 5/2002 | Muckenhim et al. | 351/161 |
| 6,457,826 | B1 | 10/2002 | Lett | 351/161 |
| 6,511,178 | B1 | 1/2003 | Roffman et al. | 351/161 |
| 6,536,899 | B1 | 3/2003 | Fiala | 351/168 |

TORIC MULTIFOCAL CONTACT LENSES

This application claims the benefit under 35 USC § 119 (e) of U.S. provisional application No. 60/400,254, filed Jul. 31, 2002, incorporated by reference in its entirety.

This invention is related to contact lenses. In particular, the present invention is related to toric multifocal contact lenses having a cylindrical optical surface (or power) to correct astigmatism vision errors and a multifocal power to compensate for presbyopia.

BACKGROUND

Contact lenses are widely used for correcting many different types of vision deficiencies. These include defects such as near-sightedness and far-sightedness (myopia and hypermetropia, respectively), astigmatism vision errors, and defects in near range vision usually associated with aging (presbyopia).

It is believed that presbyopia occurs as a person ages when the lens of eye begins to crystallize and lose its elasticity, eventually resulting in the eye losing the ability to focus at near distances, such as the normal reading distance, and in some cases at intermediate distances. Presbyopic persons (presbyopes) complain of difficulty performing close tasks. To compensate for presbyopia, ophthalmic lenses are required that are more positively powered or less negatively powered than the distance correction. Some presbyopic persons have both near vision and far vision defects, requiring bifocal or multifocal lenses, instead of single vision lenses, to properly correct their vision.

Large populations of presbyopes also have an astigmatism vision error. Astigmatism is optical power meridian-dependent refractive error in an eye. This is usually due to one or more refractive surfaces, most commonly the anterior cornea, having a toroidal shape. It may also be due to one or more surfaces being transversely displaced or tilted. Astigmatism is usually regular, which means that the principal (maximum and minimum power) meridians are perpendicular to each other. People with astigmatism have blurred vision at all distances, although this may be worse at distance or near, depending on the type of astigmatism. These people may complain of sore eyes and headaches associated with demanding visual tasks. Astigmatism can be corrected with an astigmatic ophthalmic lens, which usually has one spherical surface and one toroidal (cylindrical) surface.

However, current contact lenses are unable to correct both astigmatism and presbyopia. Therefore, there is a need for a contact lens having a cylindrical optical surface (or power) to correct astigmatism vision errors and a multifocal power to compensate for presbyopia.

An object of the invention is to provide a contact lens having a cylindrical optical surface (or power) to correct astigmatism vision errors and a multifocal power to compensate for presbyopia.

Another object of the invention is to provide a method for producing a contact lens having a cylindrical optical surface (or power) to correct astigmatism vision errors and a multifocal power to compensate for presbyopia.

A further object of the invention is provide a family of contact lenses having a series of different cylindrical power corrections and a multifocal power to compensate for presbyopia.

SUMMARY OF THE INVENTION

In accomplishing the foregoing, there is provided, in accordance with one aspect of the present invention, a toric multifocal contact lens having a cylindrical optical power to correct astigmatism vision errors and a multifocal power to compensate for presbyopia. A toric multifocal contact lens of the invention has a central axis, an anterior surface having a first central optical zone, and an opposite posterior surface having a second central optical zone. The first central optical zone and the second central optical zone combine to provide a cylindrical optical power to correct astigmatism vision errors and a multifocal power to compensate for presbyopia.

The invention, in another aspect, provides a method for producing a toric multifocal contact lens having a cylindrical optical surface power to correct astigmatism vision errors and a multifocal power to compensate for presbyopia. The method comprises the steps of shaping a contact lens by a manufacturing means to have a convex surface having a first central optical zone and a concave surface having a second central optical zone, wherein the first central optical zone and the second central optical zone combine to provide a cylindrical optical power to correct astigmatism vision errors and a multifocal power to compensate for presbyopia.

The invention, in a further aspect, provides a family of contact lenses comprising contact lenses having a series of different cylindrical power corrections, wherein each contact lens in the series has central axis, an anterior surface having a first central optical zone, and an opposite posterior surface having a second central optical zone, wherein the first central optical zone and the second central optical zone combine to provide a cylindrical optical power to correct astigmatism vision errors and a multifocal power to compensate for presbyopia.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE PREFERRED EMBODIMENTS

Figure 1:
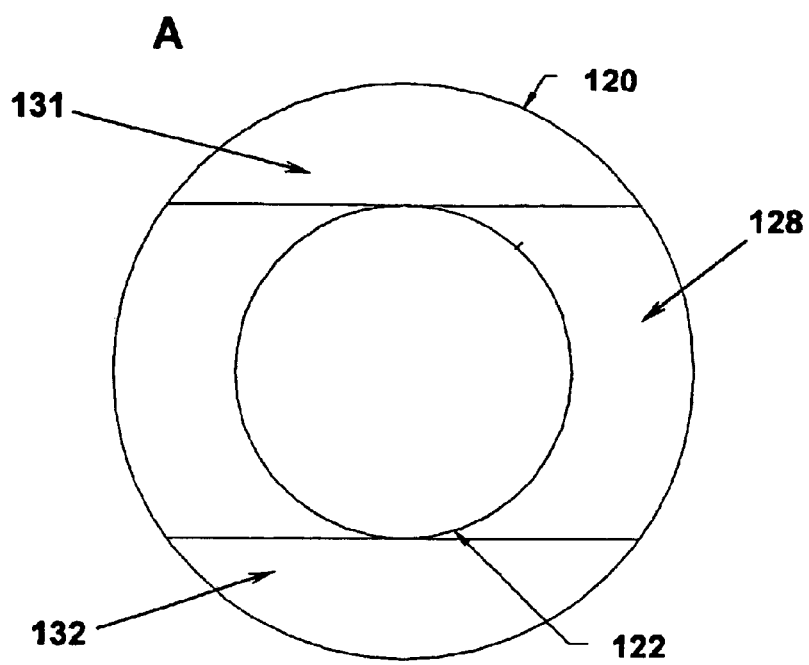
FIG. 1 (A and B) schematically shows a toric multifocal contact lens according to a preferred embodiment of the invention.
Figure 1:
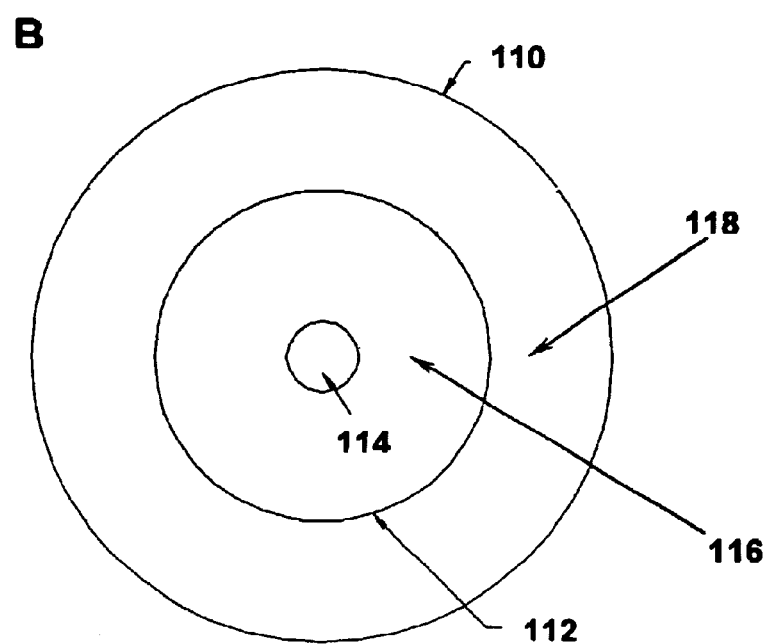
Figure 2:
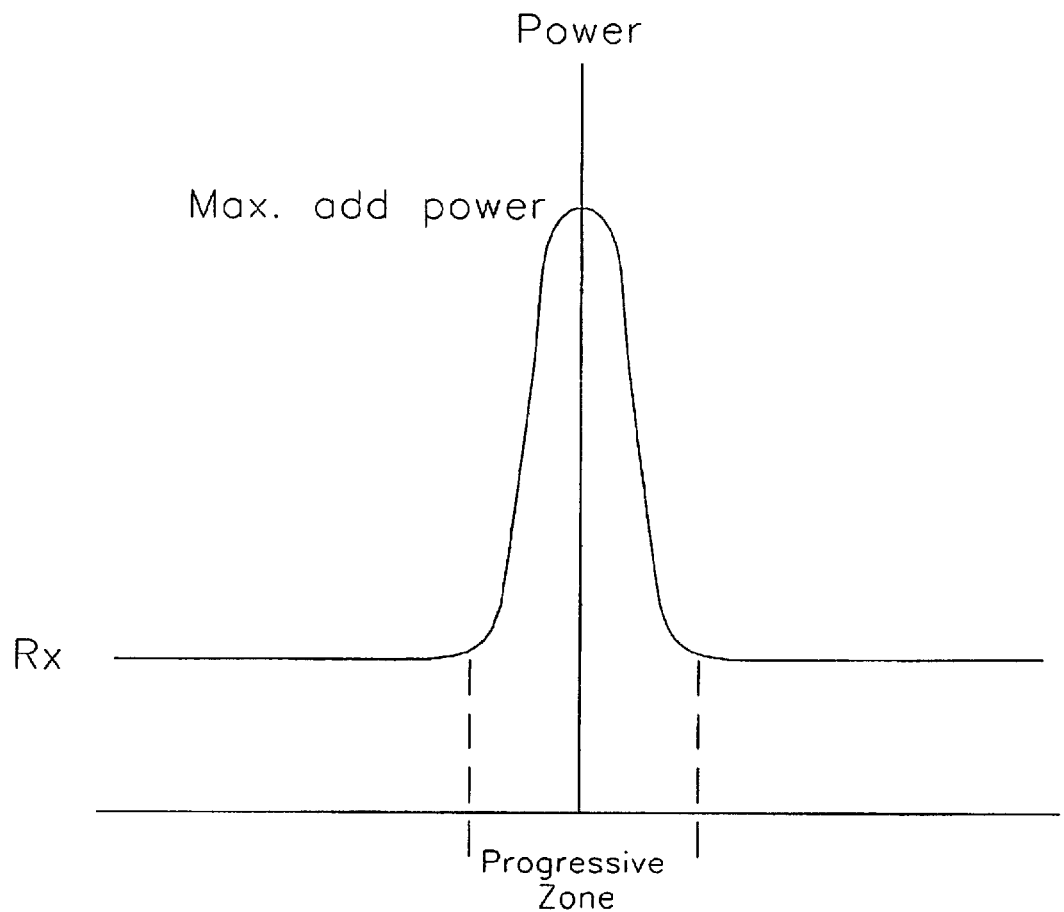
FIG. 2 shows the power of the progressive zone.

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

In one embodiment, the present invention provides a toric multifocal contact lens. The toric multifocal contact lens of the invention has a central axis, an anterior surface having a first central optical zone and an opposite posterior surface having a second central optical zone. One of the first and second optical zones is a toroidal surface or a biconic surface, the other central optical zone comprises a central circular area having a diameter of from about 1.0 mm to about 3.00 mm and an annular region surrounding the central circular area. The central circular area and the annular region are concentric with the central axis. The first and second optical zones combine together to provide a cylindrical optical power to correct astigmatism vision errors and a multifocal power to compensate for presbyopia.

The toroidal surface is formed by defining a curve in the Y-Z plane, wherein the Z-axis passes through the apex of the curve in normal direction, and then rotating this curve around an axis parallel to the Y-axis from a distance r. The value of the distance r is selected based on a desired cylindrical optical power of a contact lens for correcting a wearer's astigmatism. The curve can be defined by equation (1):

$$z = \frac{cy^2}{1 + \sqrt{1 - (1+k)c^2 y^2}} + \alpha_1 y^2 + \alpha_2 y^4 + \alpha_3 y^6 + \alpha_4 y^8 + \alpha_5 y^{10} + \alpha_6 y^{12} + \alpha_7 y^{14} \quad (1)$$

in which c is the curvature (the reciprocal of the radius), k is the conic constant and $\alpha_1$ to $\alpha_7$ are the coefficients. The value of the distance r can be selected to impart a desired cylindrical optical power to the contact lens for correcting astigmatism errors of an eye.

The biconic surface is defined by equation (2):

$$z = \frac{c_x x^2 + c_y y^2}{1 + \sqrt{1 - (1+k_x)c_x^2 x^2 - (1-k_y)c_y^2 y^2}} \quad (2)$$

where $c_x$ and $c_y$ are the curvatures at x and y meridians, $k_x$ and $k_y$ are conic constants, and Z-axis passes through the apex of the surface.

The annular region surrounding the central circular area has a surface to provide a substantially constant power (base power) from the inner peripheral edge to the outer peripheral edge for distance vision correction. The surface can be spherical or aspherical.

The central circular area is a progressive power addition zone for near vision correction and optionally for intermediate vision correction. It is substantially concentric with the central axis. The progressive power addition zone preferably has a diameter of about 1.0 to about 3.0, more preferably about 1.8 mm to 2.3 mm.

The progressive power addition zone has a surface that provides a power that decreases progressively from the center of the central circular area to the inner peripheral edge of the annular region. The power addition profile of the central circular area can be defined by a plurality of (at least two) linear equations (3), $$\begin{cases} p(x) = b_1 + k_1 x & 0 \leq x < x_1 \\ p(x) = b_2 + k_2 x & x_1 \leq x < x_2 \\ \vdots \\ p(x) = b_i + k_i x & x_{i-1} \leq x < x_i \\ \vdots \end{cases} \quad (3)$$

in which p(x) is an added power at a distance of x from the center; $b_i$ is a coefficient which is the intercept of a linear line; and $k_i$ is the rate of change of the added power as function of the distance from the center. $b_1$ can be considered as the added maximum power and can have a value from about 3 to 10, preferably a value of about 5. Each function defins an added power within a specific range, for example, between $x_{i-1}$ and $x_i$ within the progressive power addition zone. In a preferred embodiment, the added power profile is defined by two or more linear functions.

Alternatively, the progressive power addition zone can have a surface that provides a power addition profile which is defined by equation (4) or equation (5), $$p(x) = \frac{A}{2} \cdot \cos\left(\frac{x}{\frac{D}{2}} \pi\right) + \frac{A}{2} \quad (4)$$

$$p(x) = A \cdot \left[1 - \left(\frac{x}{\frac{D}{2}}\right)^n\right] \quad (5)$$

in which p(x) is an added power at a distance of x from the center; A is the maximum added power; D is the diameter of the progressive power addition zone; and n is any number which can be an integer or non-integer larger than 1 but smaller than or equal to 10. Preferably, n is larger than or equal to 3 but smaller than or equal to 5.

The surface of the progressive power addition zone can be formed by rotating a curve around the central axis. Such curve can be obtained by any suitable method known by a person skilled in the art. For example, first, a series of discrete power points along the X-axis is calculated according to any one of equations (3) to (5). Then, a spline-based function is used to describe a curve that passes through each of the series of calculated power points and is normal to the central axis (rotational axis) and tangent to the curve of the annular region. In a preferred embodiment, the series of power points are evenly distributed along the X-axis. In another preferred embodiment, the number of the series of power points is from 10 to 30.

Preferably, the first central optical zone of the anterior surface is the toroidal surface or the biconic surface and the posterior surface comprises the progressive power addition zone.

The central optical zone, which is a toroidal or biconic surface, can have a shape of any conventional toric lens. Preferably, it is circular. More preferably, it is substantially concentric with the central axis.

In a preferred embodiment, both the first central optical zone on the anterior surface and the second central optical zone on the posterior surface are substantially concentric with the central axis.

The toric multifocal contact lens of the invention can further comprise one or more orientation features that provide a predetermined orientation on the eye. Exemplary orientation features include, but are not limited to, two thin zones, contour double slab-off, prism ballast carrier, and the like.

FIG. 1 schematically shows a toric multifocal contact lens according to a preferred embodiment of the invention. The toric multifocal contact lens 100 has a diameter about 14.5 mm. The toric multifocal contact lens 100 has a concave (or posterior) surface 110 and an opposite convex (or anterior) surface 120, and a central axis passing through the apex of the convex (anterior) surface.

The convex surface 120 comprises a first central optical zone 122, which is circular in shape and is substantially concentric with the central axis, and a first non-optical peripheral zone 128.

The first non-optical peripheral zone 128 has two slab-off zones, a top slab-off zone 131 and a bottom slab-off zone 132. These double slab-off features can help in maintaining the lens orientation on the eye. It is understood that other configurations of double slab-off features or any orientation features known to a person skilled in the art can be used in the present invention.

The central optical zone 122 is a toroidal surface and has a diameter of about 8 mm. The toroidal surface is formed by defining a curve in the Y-Z plane, wherein the Z-axis coincides with or is parallel to the central axis of the lens, and then rotating this curve around an axis parallel to the Y-axis from a distance r the value of which is selected to impart a desired cylindrical optical power to the contact lens for correcting astigmatism errors of an eye. The curve is defined by a spherical function, e.g., by equation (1) in which the coefficients $\alpha_1$ to $\alpha_7$ and k are zero.

The concave surface 110 has a second central optical zone 112 and a second non-optical peripheral zone 118 surrounding the second central optical zone 112. The second central optical zone 112 is circular in shape and has a diameter of about 8 mm and comprises a circular central area 114 and an annular region 116 surrounding the circular central area 114. The circular central area 114 and the annular region 116 are concentric with the central axis.

The circular central area 114 is a progressive power addition zone 114 concentric with the central axis. The diameter of the progressive power addition zone 114 is about 1.98 mm. The progressive power addition zone 114 has a power which decreases progressively from the center to the edge of the progressive power addition zone 114.

The annular region 116 has a spherical surface. It is understood that the annular region can be an aspheric surface.

It is well known to those skilled in the art that the optical power of a contact lens is, inter alia, a function of the index of refraction of the lens material and the algebraic difference between the curvatures of the anterior surface and the posterior surface of the lens. The first central optical zone 122 and the second central optical zone 112 combine to provide a cylindrical optical power to correct astigmatism vision errors and a multifocal power to compensate for presbyopia.

In a second embodiment, the present invention provides a contact lens having a central axis, an anterior surface having a first central optical zone, and an opposite posterior surface having a second central optical zone, wherein at least one of the first central optical zone and the second central optical zone has a central circular area and an annular region surrounding the central circular area, wherein the central circular area has a diameter of about 1.0 to about 3.0 mm and is a progressive power addition zone for near vision correction and optionally for intermediate vision correction, wherein the annular region has an optical power for distant vision correction, wherein the central circular area and the annular region are concentric with the central axis and provide one substantially identical cylindrical optical power for correcting astigmatism vision errors.

In this embodiment, both the toric and multifocal optics features are either on the anterior surface or on the posterior surface. Preferably, both the toric and multifocal optics features are on the anterior surface. Since both the toric and the multifocal optics features are on one of the surfaces, a toric multifocal contact lens of the invention has a non-rotationally-symmetric surface design. With advances in computer aided design (CAD) technologies, a person skilled in the art now can design a contact lens having complex surface designs including non-rotationally-symmetric surfaces.

The surface of the optical zone having both the toric features and the multifocal features is designed to provide along each of a series of meridians one power profile within the circular area and a substantially constant power (base power) within the annular region. The number of meridians is at least 2, preferably at least 8.

The power profile within the circular area along each of a series of meridians can be describe by a plurality of (at least two) linear equations (6), $$\begin{cases} P_\theta(x) = b_1 + k_1 x + p_\theta & 0 \leq x < x_1 \\ P_\theta(x) = b_2 + k_2 x + p_\theta & x_1 \leq x < x_2 \\ \vdots \\ P_\theta(x) = b_i + k_i x + p_\theta & x_{i-1} \leq x < x_i \\ \vdots \end{cases} \quad (6)$$

in which $P_\theta(x)$ is a power along the meridian at a distance of x from the center; $b_i$ is a coefficient which is the intercept of a linear line; and $k_i$ is the rate of change of the added power as function of the distance from the center; and $P_\theta$ is the base power along that meridian. The base power $p_\theta$ is varied at different meridian for correcting astigmatism errors of the eye. $b_1$ is the added maximum power and can have a value from about 3 to 10, preferably a value of about 5. Each function defins an added power at one meridian within a specific range, for example, between a distance of $x_{i-1}$ from the center and a distance of $x_i$ from the center within the progressive power addition zone.

Alternatively, the power profile within the circular area along each of a series of meridians is defined by equation (4) or equation (5), $$P_\theta(x) = \frac{A}{2} \cdot \cos\left(\frac{\pi x}{\frac{D}{2}}\right) + \frac{A}{2} + p_\theta \quad (7)$$

$$P_\theta(x) = A \cdot \left[1 - \left(\frac{x}{\frac{D}{2}}\right)^n\right] + p_\theta \quad (8)$$

in which $P_\theta(x)$ is a power at a distance of x from the center at a meridian; A is the maximum added power; D is the diameter of the progressive power addition zone; n is any number which can be an integer or non-integer larger than 1 but smaller than or equal to 10; and $p_\theta$ is the base power at that meridian. Preferably, n is larger than or equal to 3 but smaller than or equal to 5.

The annular region surrounding the central circular area can have an aspherical surface to provide a substantially constant base power for distance vision correction and a cylindrical power, identical to that provided by the central circular area, for correcting astigmatism errors of the eye.

It is understood that a person skilled in the art can use spline-based mathematical functions or several different surface patches to design at least one of the anterior surface and the posterior surface which has a central circular progressive power addition zone and an annular region and which provide one identical cylindrical power.

"Surface patches" refer to combinations of curvatures and lines that are continuous in first derivative, preferably in second derivative, from each other.

By using an optical computer aided design (CAD) system and a mechanical CAD system, one can design a toric multifocal contact lens of the invention, one of the surfaces which comprises a central optical zone having a toric optics feature and/or a multifocal optics feature so that the toric multifocal contact lens can have a cylindrical optical power to correct astigmatism and a multifocal power to compensate for presbyopia.

An optical CAD system is used to design an optical model lens. "An optical model lens" refers to an ophthalmic lens that is designed in a computer system and generally does not contain other non-optical systems which are parts of an ophthalmic lens. Exemplary non-optical systems of a contact lens include, but are not limited to bevel, lenticular, orientation features, and edge that joins the anterior and posterior surfaces of a contact lens.

"A bevel" refers to a non-optical surface zone located at the edge of the posterior surface of a contact lens. Generally, the bevel is a significantly flatter curve and is usually blended with the base curve (optical posterior surface) of a contact lens and appears as an upward taper near the edge. This keeps the steeper base curve radius from gripping the eye and allows the edge to lift slightly. This edge lift is important for the proper flow of tears across the cornea and makes the lens fit more comfortable.

"A lenticular" refers to a non-optical surface zone of the anterior surface of a contact lens between the optical zone and the edge. The primary function of the lenticular is to control the thickness of the lens edge.

Any known, suitable optical computer aided design (CAD) system may be used to design an optical model lens. Exemplary optical computer aided design systems includes, but are not limited to Advanced System Analysis program (ASAP) from Breault Research Organization and ZEMAX (Focus Software, Inc.). Preferably, the optical design will be performed using Advanced System Analysis program (ASAP) from Breault Research Organization with input from ZEMAX (Focus Software, Inc.).

The design of the optical model lens can be transformed by, for example, a mechanical CAD system, into a mechanical lens design that includes optical zones, non-optical zones and non-optical features. Exemplary non-optical zones and features of a contact lens include, but are not limited to bevel, lenticular, edge that joins the anterior and posterior surfaces of a contact lens, orientation features, and the like. Exemplary orientation features include, but are not limited to, a prism ballast or the like that uses a varying thickness profile to control the lens orientation, a faceted surface (e.g., ridge-off zone) in which parts of the lens geometry is removed to control the lens orientation, a ridge feature which orients the lens by interacting with the eyelid. Preferably, when transforming the design of an optimized optical model lens into a mechanical lens design, some common features of a family of contact lenses can be incorporated.

Any know, suitable mechanical CAD system can be used in the invention. Preferably, a mechanical CAD system capable of representing precisely and mathematically high order surfaces is used to design a contact lens. An example of such mechanical CAD system is Pro/Engineer.

Preferably, the design of a contact lens may be translated back and forth between the optical CAD and mechanical CAD systems using a translation format which allows a receiving system, either optical CAD or mechanical CAD, to construct NURBs or Beizier surfaces of an intended design. Exemplary translation formats include, but are not limited to, VDA (verband der automobilindustrie) and IGES (Initial Graphics Exchange Specification). By using such translation formats, overall surface of lenses can be in a continuous form that facilitates the production of lenses having radially asymmetrical shapes. Beizier and NURBs surface are particular advantageous for presbyopic design because multiple zones can be blended, analyzed and optimized.

Any mathematical function can be used to describe the anterior surface, posterior surface, peripheral edge of an ophthalmic lens, as long as they have sufficient dynamic range which allow the design of that lens to be optimized. Exemplary mathematical functions include conic and quadric functions, polynomials of any degree, Zernike polynomials, exponential functions, trigonometric functions, hyperbolic functions, rational functions, Fourier series, and wavelets. Preferably, a combination of two or more mathematical functions are used to describe the front (anterior) surface and base (posterior) surface of an ophthalmic lens. More preferably, Zernike polynomials are used to describe the front (anterior) surface and base (posterior) surface of an ophthalmic lens. Even more preferably, Zernike polynomials and spline-based mathematical functions are used together to describe the front (anterior) surface and base (posterior) surface of an ophthalmic lens.

In a further embodiment, the present invention provides a family of toric multifocal contact lenses having a series of different cylindrical power corrections, wherein each contact lens in the series has central axis, an anterior surface having a first central optical zone, and an opposite posterior surface having a second central optical zone, wherein the first central optical zone and the second central optical zone combine to provide one of the series of different cylindrical optical power to correct astigmatism vision errors and a multifocal power to compensate for presbyopia. The cylindrical optical power is provided by a toric optics feature either on the anterior surface or on the posterior surface, preferably on the anterior surface. The multifocal power is provided by a mutifocal optics feature either on the anterior surface or on the posterior surface, preferably on the posterior surface. Both the toric optics feature and the multifocal feature can be located on one of the anterior and posterior surfaces, preferably on the anterior surface.

Toric multifocal contact lenses of the invention can be either hard or soft lenses. Soft toric multifocal contact lenses of the invention is preferably made from a soft contact lens material, such as a silicon hydro-gel or HEMA. It will be understood that any lens described above comprising any soft contact lens material would fall within the scope of the invention.

After completing a desired design, a toric multifocal contact lens can be produced in a computer-controlled manufacturing system. The lens design can be converted into a data file containing control signals that is interpretably by a computer-controlled manufacturing device. A computer-controlled manufacturing device is a device that can be controlled by a computer system and that is capable of producing directly an ophthalmic lens or an optical tools for producing an ophthalmic lens. Any known, suitable computer controllable manufacturing device can be used in the invention. Preferably, a computer controllable manufacturing device is a numerically controlled lathe, preferably a two-axis lathe with a 45° piezo cutter or a lathe apparatus disclosed by Durazo and Morgan in U.S. Pat. No. 6,122,999, herein incorporated by reference in its entirety, more preferably a numerically controlled lathe from Precitech, Inc., for example, such as Optoform ultra-precision lathes (models 30, 40, 50 and 80) having Variform piezo-ceramic fast tool servo attachment.

Toric multifocal contact lenses of the invention can now be manufactured each of which has a cylindrical optical power to correct astigmatism vision errors and a multifocal power to compensate for presbyopia. Toric multifocal contact lenses of the invention may be produced by any convenient means, for example, such as lathing and molding. Preferably, toric multifocal contact lenses are molded from contact lens molds including molding surfaces that replicate the contact lens surfaces when a lens is cast in the molds. For example, an optical cutting tool with a numerically controlled lathe may be used to form metallic optical tools. The tools are then used to make convex and concave surface molds that are then used, in conjunction with each other, to form the lens of the invention using a suitable liquid lens-forming material placed between the molds followed by compression and curing of the lens-forming material.

Accordingly, contact lenses according to the invention can be manufactured by imparting contact lens molds two molding surfaces, a first molding surface and a second molding surface. The molds having the first molding surface or the second molding surface, in conjunction with each other, form a toric multifocal contact lens comprising a convex surface having a first central optical zone and a concave surface having a second central optical zone, wherein the first central optical zone and the second central optical zone combine to provide a cylindrical optical power to correct astigmatism vision errors and a multifocal power to compensate for presbyopia.

In a still further embodiment, the present invention provides a method for producing a toric multifocal contact lens having a cylindrical optical surface power to correct astigmatism vision errors and a multifocal power to compensate for presbyopia. The method comprises the steps of shaping a contact lens by a manufacturing means to have convex surface having a first central optical zone and a concave surface having a second central optical zone, wherein the first central optical zone and the second central optical zone combine to provide a cylindrical optical power to correct astigmatism vision errors and a multifocal power to compensate for presbyopia.

The cylindrical optical power is provided by a toric optics feature either on the anterior surface or on the posterior surface, preferably on the anterior surface. The multifocal power is provided by a mutifocal optics feature either on the anterior surface or on the posterior surface, preferably on the posterior surface. Both the toric optics feature and the multifocal feature can be located on one of the anterior and posterior surfaces, preferably on the anterior surface.

Preferably, a contact lens having complicated surface feature or the optical tool to be used for making the same is fabricated by using a numerically controlled lathe, for example, such as Optoform ultra-precision lathes (models 30, 40, 50 and 80) having Variform piezo-ceramic fast tool servo attachment from Precitech, Inc, according to a method described in co-pending U.S. patent application No. 10/616,378, entitled Method for Manufacturing a contact lens, herein incorporated by reference in its entirety.

As an illustrative example, production of a translating contact lens having a ramped ridge zone having a latitudinal ridge that is composed of two bumps is described as follows.

First, an user defines a set of parameters, such as a surface tolerance, a concentricity tolerance, orientation of the lens design, the number of spokes to be generated for each of the anterior and posterior surfaces, creating zero point at 0,0, orientation of Z-axis, and type of lens surface (concave or convex surface) to be converted into a geometry.

A "surface tolerance" refers to the allowed position-deviation of a projected point from an ideal position on a surface of a lens design. The deviation can be in the direction either parallel or perpendicular to the central axis of a lens design.

A "concentricity tolerance" refers to the allowed deviation of a point from a given arc.

A "spoke" refers to a ray radiating outwardly from the central axis and is perpendicular to the central axis.

A "semi-diameter spoke" refers to a line segment from the central axis to the edge of a lens design.

"Evenly-spaced semi-diameter spokes" means that all semi-diameter spokes radiate outwardly from the central axis and separate from each other by one equal angle.

A "point spacing" refers to a distance between two points along the semi-diameter spoke.

Second, an user determines the number of points to be projected onto the a surface of the lens design (for example, the anterior surface) along each of the number of evenly-spaced semi-diameter spokes in a direction parallel to the central axis. A semi-diameter spoke at an azimuthal angle, at which one of the two bumps of the anterior surface is located, is selected as the semi-diameter probing spoke. Evenly-spaced points are projected along the semi-diameter probing spoke, in which each pairs of points are separating by a point spacing of 10 microns. Then, all of the projected points are divided into a series of groups, each group composed of three consecutive points, a first point, a middle point and a third point. Each of the points can belong to either one group or two groups. One group at a time from the central axis to the edge or from the edge to the central axis, the curvature of the surface at the middle point of the group is analyzed by comparing a distance between the middle point and a line linking the first point and the third point of the corresponding group with the predetermined surface tolerance. If the distance between the middle point and the line linking the first and third points of the group is larger than the predetermined surface tolerance, the curvature of the surface at that point is sharp and an additional point is projected between the first and the middle points in that group. The point spacing between the first and additional points is equal to point spacing between the additional and middle points. After adding an additional point, all of the points included the newly added point is regrouped again and the curvature of the surface at the middle point of each of the series of groups is analyzed. Such iterative procedure is repeated until the distance between the middle point of each of the series of groups and the line linking the first and the third points of corresponding group along the probing spoke is equal to or less than the predetermined surface tolerance. In this way, the number of the points to be projected onto the surface of the lens design along each of the desired number of evenly-spaced semi-diameter spokes and point spacings for a series of pairs of neighboring points are determined.

The above-determined number of points are projected onto the anterior surface of the lens design along each of 96 semi-diameter spokes. For each of the semi-diameter spokes, a semi-meridian which is continuous in first derivative is generated. The semimeridian includes a series of arcs and optionally straight lines, wherein each arc is defined by fitting at least three consecutive points into a spherical mathematical function within a desired concentricity tolerance. Each of the straight lines is obtained by connecting at least three consecutive points. Preferably, arc fitting routine is started from the central axis to the edge.

Similarly, conversion of the posterior surface of the lens design into a geometry can be carried out according to the above described procedure.

After converting the lens design to a geometry of a contact lens to be produced in a manufacturing system, a mini-file containing both the information for the header and the information about the geometry of the lens is generated. This mini-file also contains a zero semi-meridian that is based on the average height of each of the other meridians at each of radial locations and that gives the Variform a zero position on which it can base its oscillation calculations. In this mini-file, all semi-meridians have the same number of zones. This is accomplished by copying the last zone of a semi-meridian for a number of time to equalize the numbers of zones for all meridians. After the mini-file is complete, it is loaded into an Optoform ultra-precision lathe (models 30, 40, 50 or 80) having Variform piezo-ceramic fast tool servo attachment and run to produce a translating contact lens.

The invention has been described in detail, with particular reference to certain preferred embodiments, in order to enable the reader to practice the invention without undue experimentation. A person having ordinary skill in the art will readily recognize that many of the previous components, compositions, and/or parameters may be varied or modified to a reasonable extent without departing from the scope and spirit of the invention. Furthermore, titles, headings, example materials or the like are provided to enhance the reader's comprehension of this document, and should not be read as limiting the scope of the present invention. Accordingly, the invention is defined by the following claims, and reasonable extensions and equivalents thereof.

What is claimed is:

1. A toric multifocal contact lens comprising a central axis, an anterior surface having a first central optical zone, and an opposite posterior surface having a second central optical zone, wherein one of the first central optical zone and the second central optical zone has a central circular area and an annular region surrrounding the central circular area, wherein the central circular area has a diameter of about 1.0 to about 3.0 mm and is a progressive power addition zone for near vision correction and optionally for intermediate vision correction, wherein the annular region has a spherical or aspheric surface having an optical power for distant vision correction, wherein the central circular area and the annular region are concentric with the central axis, wherein the other one of the first central optical zone and the second central optical zone is a toroidal surface or a biconic surface, wherein the progressive power addition zone has a surface that provides a power addition profile defined by two or more linear functions of equation (3) or by equation (4) or equation (5)

$$\begin{cases} p(x) = b_1 + k_1 x & 0 \leq x < x_1 \\ p(x) = b_2 + k_2 x & x_1 \leq x < x_2 \\ \vdots \\ p(x) = b_i + k_i x & x_{i-1} \leq x < x_i \\ \vdots \end{cases} \quad (3)$$

$$p(x) = \frac{A}{2} \cdot \cos\left(\frac{x}{\frac{D}{2}} \cdot \pi\right) + \frac{A}{2} \quad (4)$$

$$p(x) = A \cdot \left[1 - \left(\frac{x}{\frac{D}{2}}\right)^n\right] \quad (5)$$

wherein p(x) is an added power at a distance of x from the center; $b_i$ is a coefficient which is the intercept of a linear line; and $k_i$ is the rate of change of the added power as function of the distance from the center; A is the maximum added power; D is the diameter of the progressive power addition zone; and n is any number which can be an integer or non-integer larger than 1 but smaller than or equal to 10, and wherein the first and second central optical zone combine to provide a cylindrical optical power to correct astigmatism vision errors and a multifocal optical power to compensate for presbyopia.

2. A toric multifocal contact lens of claim 1, wherein the power addition profile is defined by at least two linear functions of equation (3).

3. A toric multifocal contact lens of claim 2, wherein the power addition profile is defined by a first linear function of $p(x)=b_1+k_1 x$ and a second linear function of $p(x)=b_2+k_2 x$, wherein $b_1$ has a value of from about 3 to about 10, $k_1$ has a value from −1 to −10, $b_2$ is from 5 to 12 and $k_2$ is from −5 to −13.

4. A toric multifocal contact lens of claim 1, wherein the power addition profile is defined by equation (4), wherein A has a value of from about 3 to about 10.

5. A toric multifocal contact lens of claim 1, wherein the power addition profile is defined by equation (5), wherein A has a value of from about 3 to about 10, and wherein $3 \leq n \leq 5$.

6. A toric multifocal contact lens of claim 1, wherein the other one of the first central optical zone and the second central optical zone is the biconic surface.

7. A toric multifocal contact lens of claim 1, wherein the diameter of said progressive power zone is about 1.8 mm to about 2.3 mm.

8. A toric multifocal contact lens of claim 1, wherein said first central optical zone has said central circular area and said annular region surrrounding said central circular area, and wherein said second central optical zone is said toroidal surface or said biconic surface.

9. A toric multifocal contact lens of claim 8, wherein the diameter of said progressive power zone is about 1.8 mm to about 2.3 mm.

10. A toric multifocal contact lens of claim 1, further comprising one or more orientation features that provide a predetermined orientation on an eye.

11. A toric multifocal contact lens of claim 10, wherein the anterior surface comprises a top slab-off zone near the top of the contact lens and a bottom slab-off zone near the bottom of the contact lens.

12. A toric multifocal contact lens of claim 1, wherein said toric multifocal contact lens is a soft lens.

13. A toric multifocal contact lens of claim 1, wherein the surface of the progressive power addition zone is obtained by: (I) calculating/generating a series of discrete power points along an X-axis according to any one of equations (3) to (5); (II) using a spline-based function to describe a curve that passes through each of the series of calculated power points and is normal to the central axis and tangent to the curve of the annular region; and (III) rotating said curve around the central axis.

14. A toric multifocal contact lens of claim 13, wherein the number of the series of power points is from 10 to 30.

15. A toric multifocal contact lens of claim 13, wherein the series of power points are evenly distributed along the X-axis.

16. A method of producing a toric multifocal contact lens, comprising the steps of shaping a contact lens by a manufacturing means to have a central axis, an anterior surface having a first central optical zone, and an opposite posterior surface having a second central optical zone, wherein the first and second optical zones combine together to provide a cylindrical optical power to correct astigmatism vision errors and a multifocal power to compensate for presbyopia, wherein one of the first central optical zone and the second central optical zone has a central circular area and an annular region surrrounding the central circular area, wherein the central circular area has a diameter of about 1.0 to about 3.0 mm and is a progressive power addition zone for near vision correction and optionally for intermediate vision correction, wherein the annular region has a spherical or aspheric surface having an optical power for distant vision correction, wherein the central circular area and the annular region are concentric with the central axis, wherein the other one of the first central optical zone and the second central optical zone is a toroidal surface or a biconic surface, wherein the progressive power addition zone has a surface that provides a power addition profile defined by two or more linear functions of equation (3) or by equation (4) or equation (5)

$$\begin{cases} p(x) = b_1 + k_1 x & 0 \leq x < x_1 \\ p(x) = b_2 + k_2 x & x_1 \leq x < x_2 \\ \vdots & \\ p(x) = b_i + k_i x & x_{i-1} \leq x < x_i \\ \vdots & \end{cases} \quad (3)$$

$$p(x) = \frac{A}{2} \cdot \cos\left(\frac{x}{\frac{D}{2}} \cdot \pi\right) + \frac{A}{2} \quad (4)$$

$$p(x) = A \cdot \left[1 - \left(\frac{x}{\frac{D}{2}}\right)^n\right] \quad (5)$$

wherein $p(x)$ is an added power at a distance of x from the center; $b_i$ is a coefficient which is the intercept of a linear line; and $k_i$ is the rate of change of the added power as function of the distance from the center; A is the maximum added power; D is the diameter of the progressive power addition zone; and n is any number which can be an integer or non-integer larger than 1 but smaller than or equal to 10.

17. A method of claim 16, wherein said manufacturing means is a numerically controlled lathe or molds.

18. A method of claim 17, wherein said first central optical zone has said central circular area and said annular region surrrounding said central circular area, and wherein said second central optical zone is said toroidal surface or said biconic surface.

19. A method of claim 18, wherein the diameter of said progressive power zone is about 1.8 mm to about 2.3 mm.

20. A method of claim 17, wherein the power addition profile is defined by at least two linear functions of equation (3).

21. A method of claim 20, wherein the power addition profile is defined by a first linear function of $p(x)=b_1+k_1x$ and a second linear function of $p(x)=b_2+k_2x$, wherein $b_1$ has a value of from about 3 to about 10.

22. A method of claim 17, wherein the power addition profile is defined by equation (4), wherein A has a value of from about 3 to about 10.

23. A method of claim 17, wherein the power addition profile is defined by equation (5), wherein A has a value of from about 3 to about 10, and wherein $3 \leq n \leq 5$.

24. A method of claim 17, wherein the surface of the progressive power addition zone is designed by: (I) calculating/generating a series of discrete power points along an X-axis according to any one of equations (3) to (5); (II) using a spline-based function to describe a curve that passes through each of the series of calculated power points and is normal to the central axis and tangent to the curve of the annular region; and (III) rotating said curve around the central axis.

25. A method of claim 17, wherein the series of power points are evenly distributed along the X-axis.

26. A method of claim 17, wherein the number of the series of power points is from 10 to 30.

27. A series of toric multifocal contact lenses comprising contact lenses having a series of different cylindrical optical power corrections, wherein each contact lens in the series has has a central axis, an anterior surface having a first central optical zone, and an opposite posterior surface having a second central optical zone, wherein the first central optical zone and the second central optical zone combine to provide a cylindrical optical power to correct astigmatism vision errors and a multifocal power to compensate for presbyopia, wherein one of the first central optical zone and the second central optical zone has a central circular area and an annular region surrrounding the central circular area, wherein the central circular area has a diameter of about 1.0 to about 3.0 mm and is a progressive power addition zone for near vision correction and optionally for intermediate vision correction, wherein the annular region has a spherical or aspheric surface having an optical power for distant vision correction, wherein the central circular area and the annular region are concentric with the central axis, wherein the other one of the first central optical zone and the second central optical zone is a toroidal surface or a biconic surface, wherein the progressive power addition zone has a surface that provides a power addition profile defined by two or more linear functions of equation (3) or by equation (4) or equation (5)

$$\begin{cases} p(x) = b_1 + k_1 x & 0 \leq x < x_1 \\ p(x) = b_2 + k_2 x & x_1 \leq x < x_2 \\ \vdots & \\ p(x) = b_i + k_i x & x_{i-1} \leq x < x_i \\ \vdots & \end{cases} \quad (3)$$

-continued $$p(x) = \frac{A}{2} \cdot \cos\left(\frac{x}{\frac{D}{2}} \cdot \pi\right) + \frac{A}{2} \quad (4)$$

$$p(x) = A \cdot \left[1 - \left(\frac{x}{\frac{D}{2}}\right)^n\right] \quad (5)$$

wherein p(x) is an added power at a distance of x from the center; $b_i$ is a coefficient which is the intercept of a linear line; and $k_i$ is the rate of change of the added power as function of the distance from the center; A is the maximum added power; D is the diameter of the progressive power addition zone; and n is any number which can be an integer or non-integer larger than 1 but smaller than or equal to 10.

28. A series of toric multifocal contact lenses of claim 27, wherein one of the first central optical zone and the second central optical zone is the toroidal surface defined by equation (2).

29. A series of toric multifocal contact lenses of claim 27, wherein said first central optical zone has said central circular area and said annular region surrrounding said central circular area, and wherein said second central optical zone is said toroidal surface or said biconic surface.

30. A series of toric multifocal contact lenses of claim 29, wherein the diameter of said progressive power zone is about 1.8 mm to about 2.3 mm.

31. A series of toric multifocal contact lenses of claim 27, wherein the diameter of said progressive power zone is about 1.8 mm to about 2.3 mm.

32. A series of toric multifocal contact lenses of claim 31, wherein the power addition profile is defined by at least two linear functions of equation (3).

33. A series of toric multifocal contact lenses of claim 32, wherein the power addition profile is defined by a first linear function of $p(x)=b_1+k_1 x$ and a second linear function of $p(x)=b_2+k_2 x$, wherein $b_1$ has a value of from about 3 to about 10.

34. A series of toric multifocal contact lenses of claim 31, wherein the power addition profile is defined by equation (4), wherein A has a value of from about 3 to about 10.

35. A series of toric multifocal contact lenses of claim 31, wherein the power addition profile is defined by equation (5), wherein A has a value of from about 3 to about 10, and wherein $3 \leq n \leq 5$.

36. A series of toric multifocal contact lenses of claim 27, wherein each of the contact lenses further comprises one or more orientation features that provide a predetermined orientation on an eye.

37. A series of toric multifocal contact lenses of claim 36, wherein the anterior surface comprises a top slab-off zone near the top of the contact lens and a bottom slab-off zone near the bottom of the contact lens.

38. A series of toric multifocal contact lenses of claim 27, werein each contact lens in the series is a soft or hard lens.

39. A series of toric multifocal contact lenses of claim 27, wherein the surface of the progressive power addition zone is obtained by: (I) calculating/generating a series of discrete power points along an X-axis according to any one of equations (3) to (5); (II) using a spline-based function to describe a curve that passes through each of the series of calculated power points and is normal to the central axis and tangent to the curve of the annular region; and (III) rotating said curve around the central axis.

40. A series of toric multifocal contact lenses of claim 27, wherein the number of the series of power points is from 10 to 30.

41. A series of toric multifocal contact lenses of claim 27, wherein the series of power points are evenly distributed along the X-axis.

42. A toric multifocal contact lens comprising a central axis, an anterior surface having a first central optical zone, and an opposite posterior surface having a second central optical zone,
    wherein at least one of the first central optical zone and the second central optical zone has a central circular area and an annular region surrounding the central circular area and has a surface that provides along each of a series of meridians a power that decreases progressively from the center to the inner peripheral edge of the annular region and then remains substantially constant,
    wherein the power profile of said circular area along each of the series of meridians is describe by a plurality of linear equations (6) or by equation (7) or (8)

$$\begin{cases} P_\theta(x) = b_1 + k_1 x + p_\theta & 0 \leq x < x_1 \\ P_\theta(x) = b_2 + k_2 x + p_\theta & x_1 \leq x < x_2 \\ \vdots \\ P_\theta(x) = b_i + k_i x + p_\theta & x_{i-1} \leq x < x_i \\ \vdots \end{cases} \quad (6)$$

$$P_\theta(x) = \frac{A}{2} \cdot \cos\left(\frac{\pi x}{\frac{D}{2}}\right) + \frac{A}{2} + p_\theta \quad (7)$$

$$P_\theta(x) = A \cdot \left[1 - \left(\frac{x}{\frac{D}{2}}\right)^n\right] + p_\theta \quad (8)$$

in which $P_\theta(x)$ is a power along a meridian at a distance of x from the center within said circular area; $b_i$ is a coefficient which is the intercept of a linear line; $k_i$ is the rate of change of the added power as function of the distance from the center; and $P_\theta$ is the base power along that meridian,
    wherein the central circular area has a diameter of about 1.0 to about 3.0 mm,
    wherein the central circular area and the annular region are concentric with the central axis and provide one identical cylindrical optical power for correcting astigmatism vision errors.

43. A toric multifocal contact lens of claim 42, wherein the power profile of said circular area along each of the series of meridians is described by at least two linear functions of equation (6).

44. A toric multifocal contact lens of claim 43, wherein the power profile of said circular area along each of the series of meridians is described by a first function of $P_2(x)=k_1 x+b_1+P_\theta$ and a second function of $P_2(x)=k_2 x+b_2+P_\theta$, wherein $b_1$ has a vlaue of from about 3 to about 10.

45. A toric multifocal contact lens of claim 42, wherein the power profile of said circular area along each of the series of meridians is described by equation (7), wherein A has a value of from about 3 to about 10.

46. A toric multifocal contact lens of claim 42, wherein the power profile of said circular area along each of the series of meridians is described by equation (8), wherein A has a value of from about 3 to about 10, wherein $3 \leq n \leq 5$.

47. A toric multifocal contact lens of claim 42, wherein said circular area has a diameter of from about 1.8 mm to about 2.3 mm.

48. A toric multifocal contact lens of claim 42, further comprising one or more orientation features that provide a predetermined orientation on an eye.

49. A toric multifocal contact lens of claim 42, wherein the anterior surface comprises a top slab-off zone near the top of the contact lens and a bottom slab-off zone near the bottom of the contact lens.

50. A toric multifocal contact lens of claim 42, wherein said toric multifocal contact lens is a soft lens.

* * * * *